(12) United States Patent
Sasagawa

(10) Patent No.: US 7,558,474 B2
(45) Date of Patent: Jul. 7, 2009

(54) IMAGING DEVICE

(75) Inventor: Mikio Sasagawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 292 days.

(21) Appl. No.: 11/360,578

(22) Filed: Feb. 24, 2006

(65) Prior Publication Data

US 2006/0193619 A1 Aug. 31, 2006

(30) Foreign Application Priority Data

Feb. 28, 2005 (JP) ............................. 2005-054461

(51) Int. Cl.
*G03B 13/00* (2006.01)
*G03B 15/03* (2006.01)

(52) U.S. Cl. ..................... 396/106; 396/157

(58) Field of Classification Search ............... 396/61, 396/62, 79–83, 106, 109, 110, 129, 60, 104; 348/240.99, 370, 371; 362/17, 18
See application file for complete search history.

(56) References Cited

U.S. PATENT DOCUMENTS

| | | | | |
|---|---|---|---|---|
| 4,302,707 A | * | 11/1981 | Hattori | 315/241 P |
| 6,327,434 B1 | * | 12/2001 | Okumura et al. | 396/62 |
| 6,400,905 B1 | * | 6/2002 | Tenmyo | 396/175 |
| 6,424,808 B2 | * | 7/2002 | Furukawa | 396/104 |
| 6,826,364 B2 | * | 11/2004 | Kawasaki et al. | 396/157 |
| 7,321,725 B2 | * | 1/2008 | Seo et al. | 396/61 |
| 2005/0265014 A1 | * | 12/2005 | Matsui et al. | 362/5 |

FOREIGN PATENT DOCUMENTS

JP       2003-156783 A       5/2003

* cited by examiner

*Primary Examiner*—W. B. Perkey
*Assistant Examiner*—Minh Phan
(74) *Attorney, Agent, or Firm*—Sughrue Mion, PLLC

(57) ABSTRACT

The present invention provides an imaging device including a photographic optical system having a zoom function, an auxiliary light irradiation device which includes an auxiliary light source emitting auxiliary light and which irradiates the auxiliary light towards a subject, a range finding device which makes the auxiliary light reflected by the subject incident on the photographic optical system to perform a focusing operation, and an auxiliary light control device which controls at least one of emitted light quantity of the auxiliary light and irradiation range of the auxiliary light in accordance with a zoom position of the photographic optical system.

18 Claims, 12 Drawing Sheets

IMAGING DEVICE

BACKGROUND OF THE INVENTION

1. Field of the Invention

The present invention relates to an imaging device, and more particularly to an imaging device which performs a focusing operation (AF) by irradiating a subject with auxiliary light.

2. Description of the Related Art

Conventionally, cameras provided with the autofocus (AF) function include those which perform the AF function by irradiating a subject with auxiliary light (AF auxiliary light) to photograph a dark object. As an example capable of changing an irradiation angle when irradiating the AF auxiliary light, there has been proposed an electronic flash light device described in the Japanese Patent Application Laid-Open No. 2003-156783.

In the camera having a zoom function, the photographing range (visual field) and the F value of a lens are changed in accordance with a zoom position of the taking lens. For this reason, depending on the zoom position of the taking lens, light quantity of the AF auxiliary light and the like becomes insufficient to cause a problem that the precision of AF is deteriorated.

SUMMARY OF THE INVENTION

The present invention has been made in view of the above described circumstance. An object of the invention is to provide an imaging device capable of improving the precision of AF by appropriately controlling the AF auxiliary light.

In order to achieve the above described object, according to the present invention, there is provided an imaging device comprising: a photographic optical system having a zoom function, an auxiliary light irradiation device which includes an auxiliary light source emitting an auxiliary light and which irradiates the auxiliary light to a subject; a range finding device which makes the auxiliary light reflected by the subject incident on the photographic optical system to perform focusing operation; and an auxiliary light control device which controls at least one of emitted light quantity of the auxiliary light and irradiation range of the auxiliary light in accordance with a zoom position of the photographic optical system.

The imaging device according to the present invention is arranged to control the emitted light quantity and irradiation range of the auxiliary light (AF auxiliary light) at the time of automatic focusing (AF) depending on a zoom position of the photographic optical system, so that the precision of AF can be improved.

The above described imaging device according to the present invention may comprise an applied voltage change device which changes a power supply voltage applied to the auxiliary light source in accordance with the zoom position of the photographic optical system. In this example, the control of emitted light quantity of the auxiliary light is performed by changing the applied voltage applied to the auxiliary light source.

The above described imaging device according to the present invention may comprise a current quantity control device which controls the quantity of current flowing through the auxiliary light irradiation device in accordance with the zoom position of the photographic optical system. In this example, the control of emitted light quantity of the auxiliary light is performed by changing the quantity of current flowing through the auxiliary light source.

In the above described imaging device according to the present invention, the auxiliary light irradiation device includes a plurality of auxiliary light sources, and the auxiliary light control device may comprise a lighting light source number change device which changes the number of the auxiliary light sources that are turned on in accordance with the zoom position of the photographic optical system. In this example, the control of emitted light quantity of the auxiliary light is performed by changing the number of lighted auxiliary light sources.

In the above described imaging device according to the present invention, the auxiliary light irradiation device may comprise a plurality of irradiation lenses irradiating the auxiliary light irradiated from the auxiliary light source to the subject, and the auxiliary light control device may be arranged to control the irradiation range of the auxiliary light by exchanging or combining the plurality of irradiation lenses. In this example, the control of irradiation range of the auxiliary light is performed by changing the combination of the irradiation lenses for irradiating the auxiliary light.

According to the present invention, the emitted light quantity and the irradiation range of the auxiliary light (AF auxiliary light) at the time of automatic focusing (AF) are arranged to be controlled in accordance with the zoom position of the photographic optical system, so that the precision of AF can be improved.

DETAILED DESCRIPTION OF THE PREFERRED EMBODIMENTS

Figure 1:
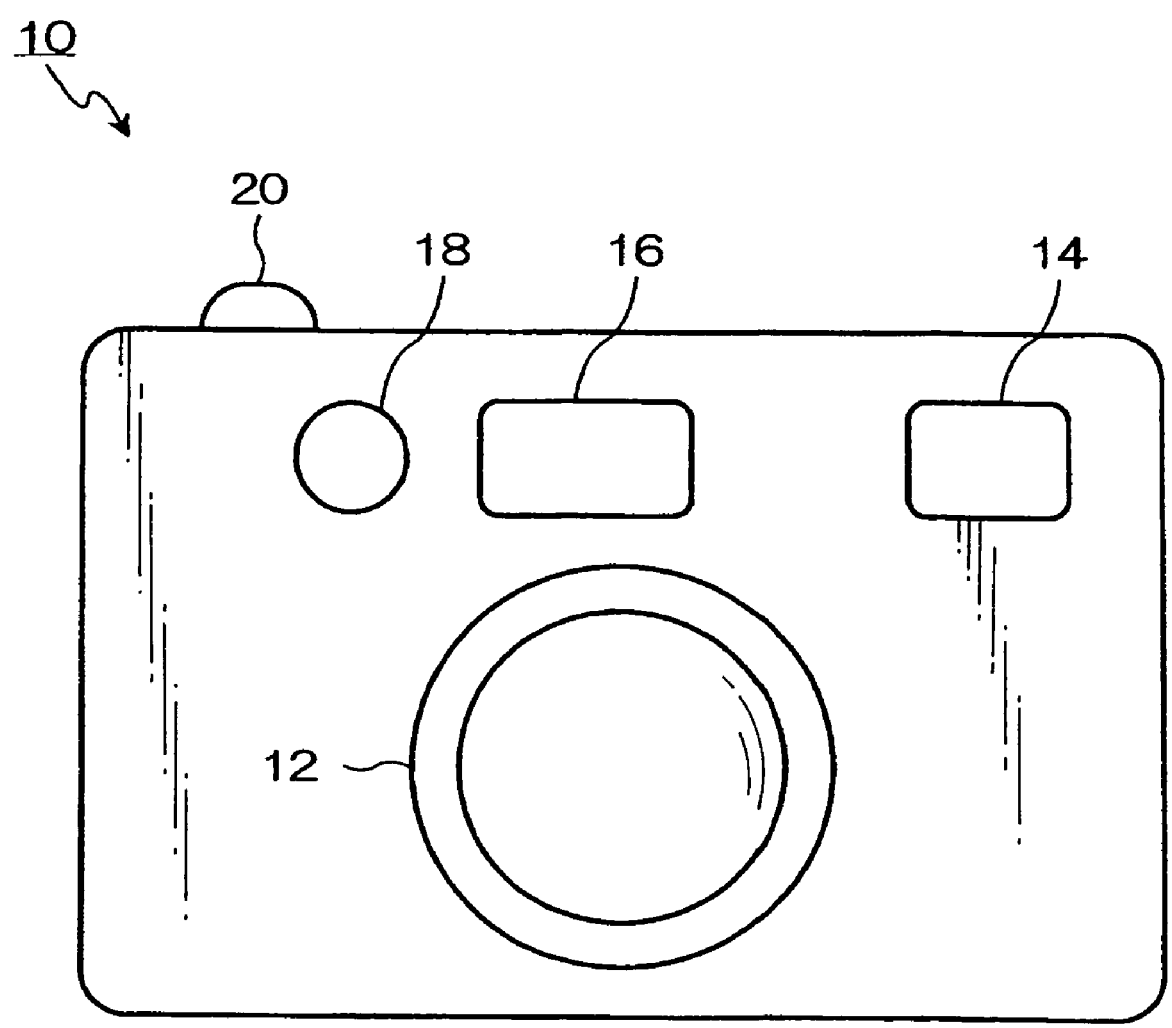
FIG. 1 is a front view of an imaging device according to an embodiment of the present invention.

In the following, preferred embodiments according to the present invention will be described with reference to accompanying drawings. FIG. 1 is a front view of an imaging device according to an embodiment of the present invention. An imaging device 10 shown in FIG. 1 is a digital camera, on the front surface of which a taking lens 12, an optical finder 14, an electronic flash light 16 and an AF auxiliary light lamp 18 are exposed. Noted that reference numeral 20 in FIG. 1 designates a release switch.

Figure 2:
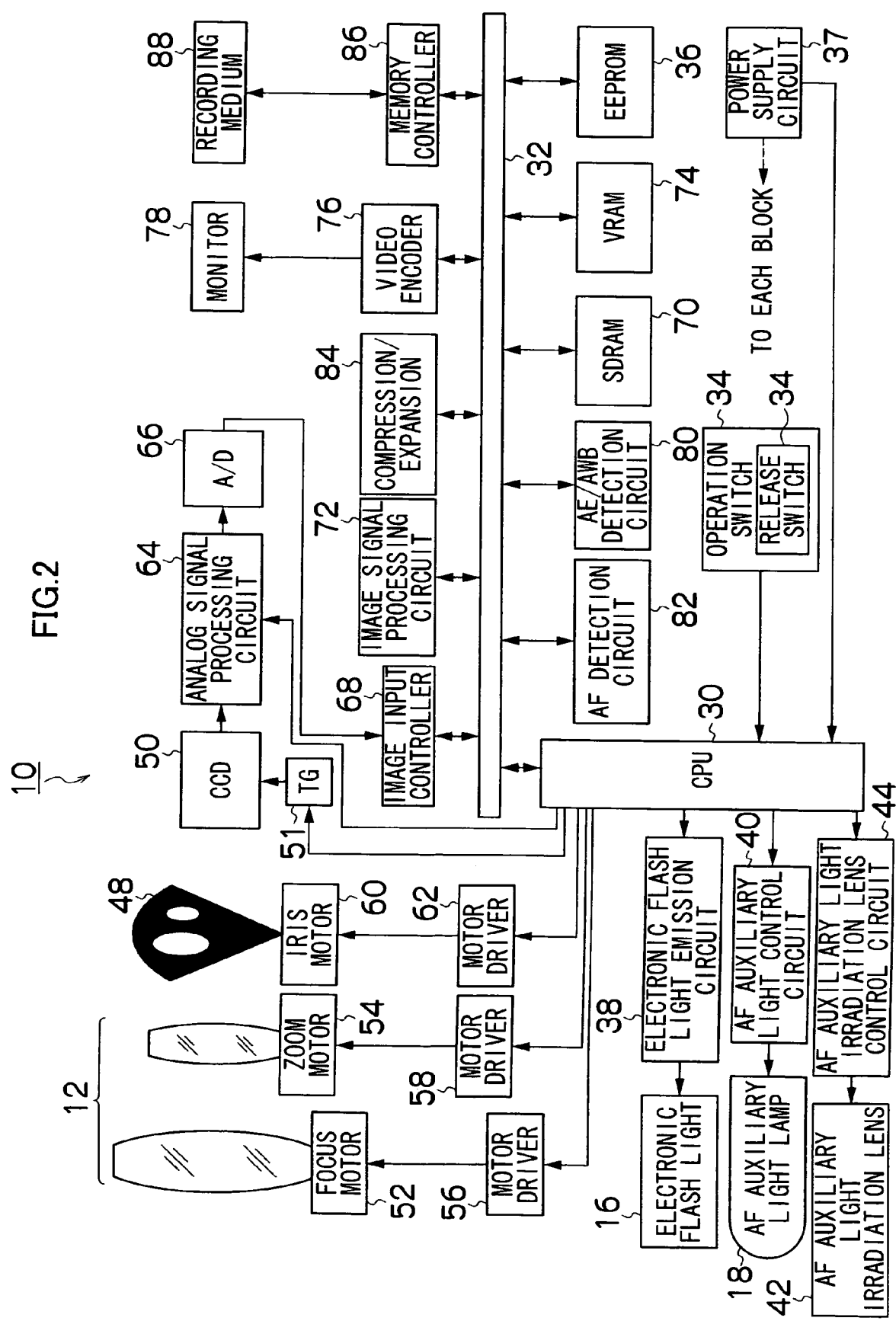
FIG. 2 is a block diagram showing an internal structure of a digital camera 10.

FIG. 2 is a block diagram showing an internal structure of the digital camera 10. As shown in FIG. 2, a CPU 30 is connected with each block of the digital camera 10 via a bus 32, and integrally controls each of the blocks on the basis of an operational input from an operation switch 34.

The operation switch 34 comprises the above described release switch 20. The release switch 20 is constituted in two steps, in which a S1=ON signal is generated by "half-depressing", and a S2=ON signal is generated by "full-depressing". The S1=ON signal and the S2=ON signal which are generated are inputted to the CPU 30 which detects the depressed state of the release switch 20 on the basis of the SI=ON signal and the S2=ON signal.

A control program of the camera, various kinds of setting data necessary for the control and the like are stored in an EEPROM 36. A power supply circuit 37 supplies power to each block of the digital camera 10.

The electronic flash light 16 is subjected to light emission control by an electronic flash light emission circuit 38 on the basis of an electronic flash light emission instruction from the CPU 30.

The AF auxiliary light lamp 18 is constituted by, for example, an LED lamp. An AF auxiliary light emission control circuit 40 is controlled by the light emission instruction from the CPU 30 based on a zoom position of the taking lens 12, so as to perform light emission control on the emitted light quantity of the AF auxiliary light lamp 18. The region (irradiation range) irradiated by the AF auxiliary light is controlled by an AF auxiliary light irradiation lens 42 in accordance with the light emission instruction from the CPU 30 based on the zoom position of the taking lens 12. The AF auxiliary light irradiation lens 42 is controlled by an AF auxiliary light irradiation lens control circuit 44 on the basis of an instruction from the CPU 30. Noted that the method for controlling the emitted light quantity and irradiation range of the AF auxiliary light will be described below.

The digital camera 10 comprises, as an image pickup device, the taking lens 12, an iris (diaphragm) 48 and an image sensor (CCD) 50.

Focusing of the taking lens 12 is performed by moving a focus lens constituting the taking lens 12 by a focus motor 52, while zooming is performed by moving a zoom lens constituting the taking lens 12 by a zoom motor 54. The focus motor 52 and the zoom motor 54 are driven and controlled by a focus motor driver 56 and a zoom motor driver 58, respectively. The CPU 30 outputs control signals to the focus motor driver 56 and the zoom motor driver 58 to control the drivers.

The diaphragm 48 is constituted by a so-called turret type diaphragm, which changes the diaphragm value (F value) by rotating a turret plate perforated with holes of F 2.8 and F8. The diaphragm 48 is driven by an iris motor 60. The iris motor 60 is driven and controlled by an iris motor driver 62. The CPU 30 outputs a control signal to the iris motor driver 62 to control the driver.

The image light from the subject is formed into an image on a light receiving surface of the CCD 50 via the taking lens 12 and the diaphragm 48. A number of photosensors are arranged on the light receiving surface of the CCD 50, and the optical image of the subject formed on the light receiving surface is converted by each of the photosensors into signal charges corresponding to the incident light. The signal charges stored in each of the photosensors are successively read in accordance with timing pulses fed by a timing generator (TG) 51, and are outputted to an analog signal processing circuit 64 as voltage signals corresponding to the signal charges.

Noted that the CCD 50 is provided with the charge sweeping drain, and the storage time (shutter speed) of the signal charges stored in each of the photosensors is controlled by making the signal charges stored in each of the photosensors swept out to the charge sweeping drain.

The analog signal processing circuit 64 includes a correlated double sampling processing circuit (CDS) and an amplifier (AMP). The voltage signals successively read out from the CCD 50, which are R, G, B signals corresponding to each pixel, are sampled, held and amplified by the analog signal processing circuit 64 so as to be inputted to an A/D converter 66.

The A/D converter 66 converts the successively inputted analog R, G, B signals into digital R, G, B signals and outputs the digital R, G, B signals, which are then temporarily stored in a memory (SDRAM) 70 via an image input controller 68. The R, G, B signals are then outputted to an image signal processing circuit 72 from the SDRAM 70.

The image signal processing circuit 72 applies predetermined signal processing such as gain control processing including offset processing, white balance correction, sensitivity correction, gamma correction processing and the like, to the inputted image signal, and outputs image data after the signal processing to a VRAM 74.

The VRAM 74 includes an area A and an area B in which the image data for one frame portion can be stored respectively, and the image data for one frame portion are rewritten alternately in the area A and the area B. Then, the rewritten image data are alternately read out.

The image data read out from the VRAM 74 are encoded by a video encoder 76, and outputted to a monitor 78 of the digital camera 10. A photographer determines the composition on the basis of the image (through image) displayed in the monitor 78, to confirm the focusing state.

Then, under the above described photographing mode, when the release switch 20 is depressed half (S1=ON), automatic exposure adjustment (AE) and automatic focusing (AF) are operated. That is, the image data outputted from the A/D converter 66 are inputted into an AE/AWB detection circuit 80 and an AF detection circuit 82 via the image input controller 68.

The AE/AWB detection circuit 80 integrates the R, G, B image data for each of R, G, B for every divided area obtained by dividing the imaging area into 64 (horizontally 8, perpendicularly 8), and outputs the integrated data for each of R, G, B for every divided area to the CPU 30.

The AF detection circuit 82 calculates a contrast evaluation value representing the contrast of an image in a specific focus area set in advance (for example, the center of the imaging area), and outputs the contrast evaluation value to the CPU 30.

The CPU 30 outputs a control signal to the focus motor driver 56 on the basis of the contrast information inputted from the AF detection circuit 82, and performs AF control of the taking lens 12 to bring the main subjects into focus.

Further, the CPU 30 calculates lightness (EV value) of the subject on the basis of the integrated data inputted from the AE/AWB detection circuit 80, and determines the diaphragm value (F value) of the diaphragm 48 and the shutter speed (charge storage time) of the CCD 50 on the basis of the EV value.

When the AE and the AF are completed and the release switch 20 is fully depressed (S2=ON), the CPU 30 outputs a drive signal to the iris motor driver 62 on the basis of the determined diaphragm value (F value), and performs drive control of the diaphragm 48 so as to make the diaphragm diameter become the determined diaphragm value (F value), while performing control of the charge storage time of the CCD 50 to effect the determined shutter speed.

The image data for one frame portion, which are taken in this way, are inputted to the SDRAM 70 from the image input controller 68 via the analog signal processing circuit 64, the A/D converter 66, and temporarily stored in the SDRAM 70. Then, the image data are read out from the SDRAM 70 to the image signal processing circuit 72, in which predetermined signal processing including processing for generating luminance data and color difference data (YC processing) is performed.

The image data after the signal processing are once stored in the SDRAM 70, and thereafter outputted to a compression/expansion processing circuit 84, in which predetermined compression processing such as JPEG (Joint Photographic Experts Group) processing is performed. Then, the image data are temporarily stored in the SDRAM 70 once more, and thereafter read out by a memory controller 86 so as to be recorded in a recording medium 88.

The image data photographed and recorded in this way are reproduced and displayed in the monitor 78 by setting the mode of the camera to a reproduction mode. At the time of the reproduction mode, the image data recorded in the recording medium 88 are read to the SDRAM 70, and are outputted from the SDRAM 70 to the compression/expansion processing circuit 84. Further, the image data is subjected to expansion processing in the compression/expansion processing circuit 84. Then, the expanded image data are temporarily stored in the SDRAM 70, and thereafter outputted to the monitor 78 via the video encoder 76. Thereby, the image data recorded in the recording medium 88 are reproduced and displayed in the monitor 78.

Figure 3:
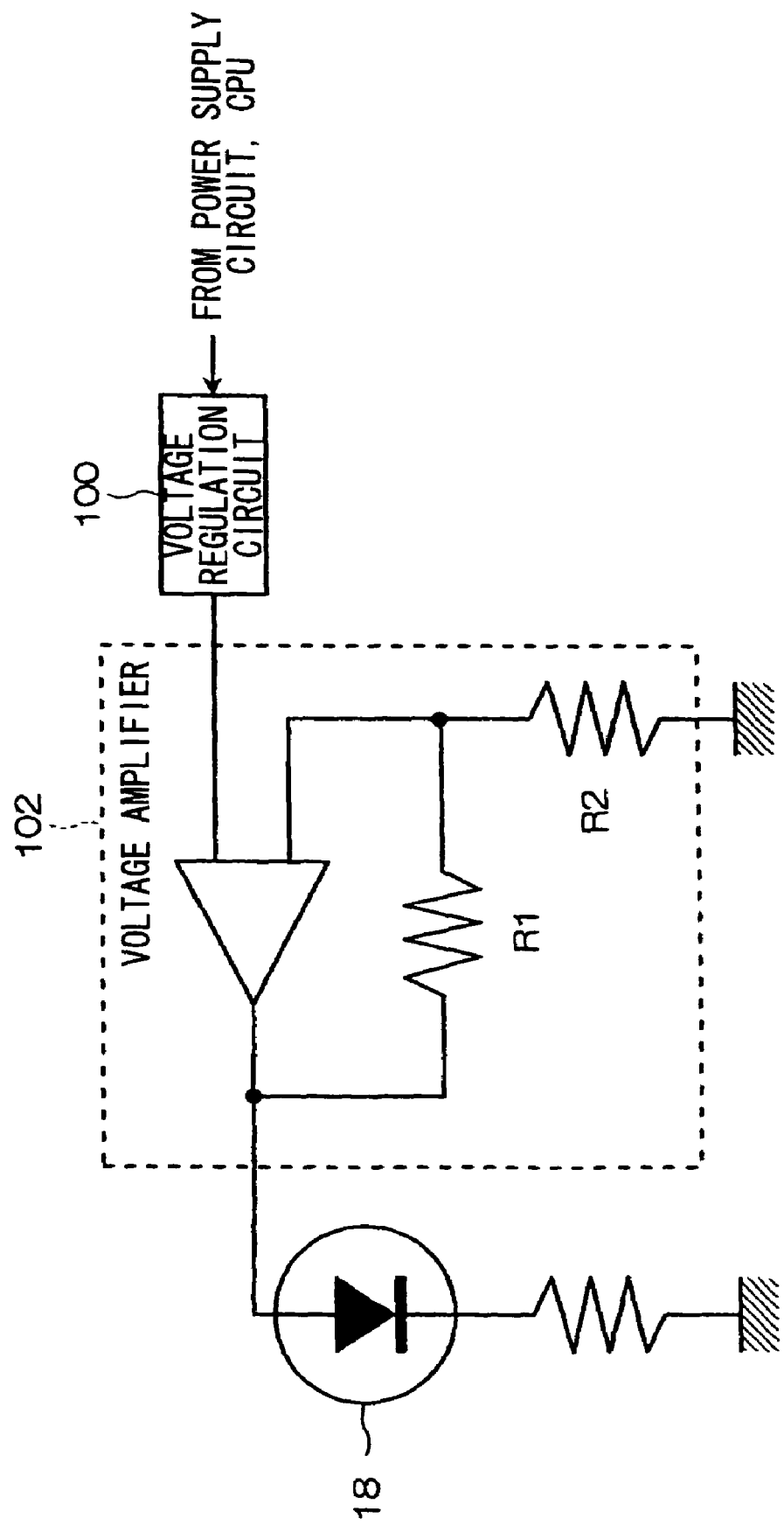
FIG. 3 is a circuit diagram showing an exemplary configuration of an AF auxiliary light emission circuit.

Next, a method for controlling emitted light quantity of the AF auxiliary light is described with reference to FIG. 3. FIG. 3 is a circuit diagram showing an exemplary configuration of an AF auxiliary light emission circuit. The AF auxiliary light emission circuit 40 shown in FIG. 3 comprises a voltage regulation circuit 100 and a voltage amplifier 102. The EEPROM 36 stores a table (voltage value-emitted light quantity table) in which the correspondence relation between the voltage value applied to the AF auxiliary light lamp 18 and the emitted light quantity of the AF auxiliary light lamp 18 is recorded. In making the AF auxiliary light emitted, the CPU 30 refers to the voltage value-emitted light quantity table in accordance with a zoom position, so as to control an electronic volume (EVR) of the voltage regulation circuit 100. The voltage regulation circuit 100 regulates a power supply voltage supplied from the power supply circuit 37 on the basis of an input from the EVR. Then, the power supply voltage is amplified by the power supply amplifier 102 at a predetermined ratio (ratio of resistance values R1 and R2), and applied to the AF auxiliary light lamp (LED) 18. Thereby, the emitted light quantity of the AF auxiliary light lamp 18 is controlled.

Figure 4:
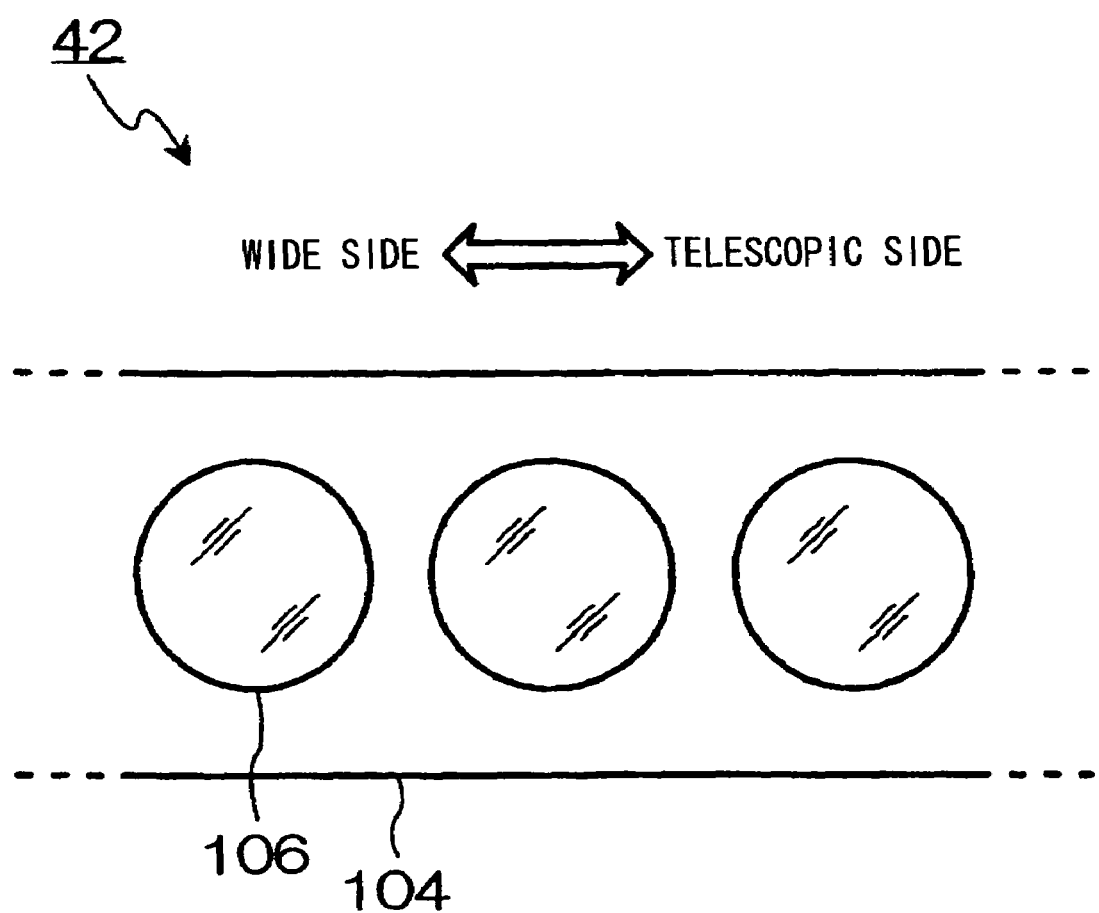
FIG. 4 is a plan view showing an AF auxiliary light irradiation lens.
Figure 5:
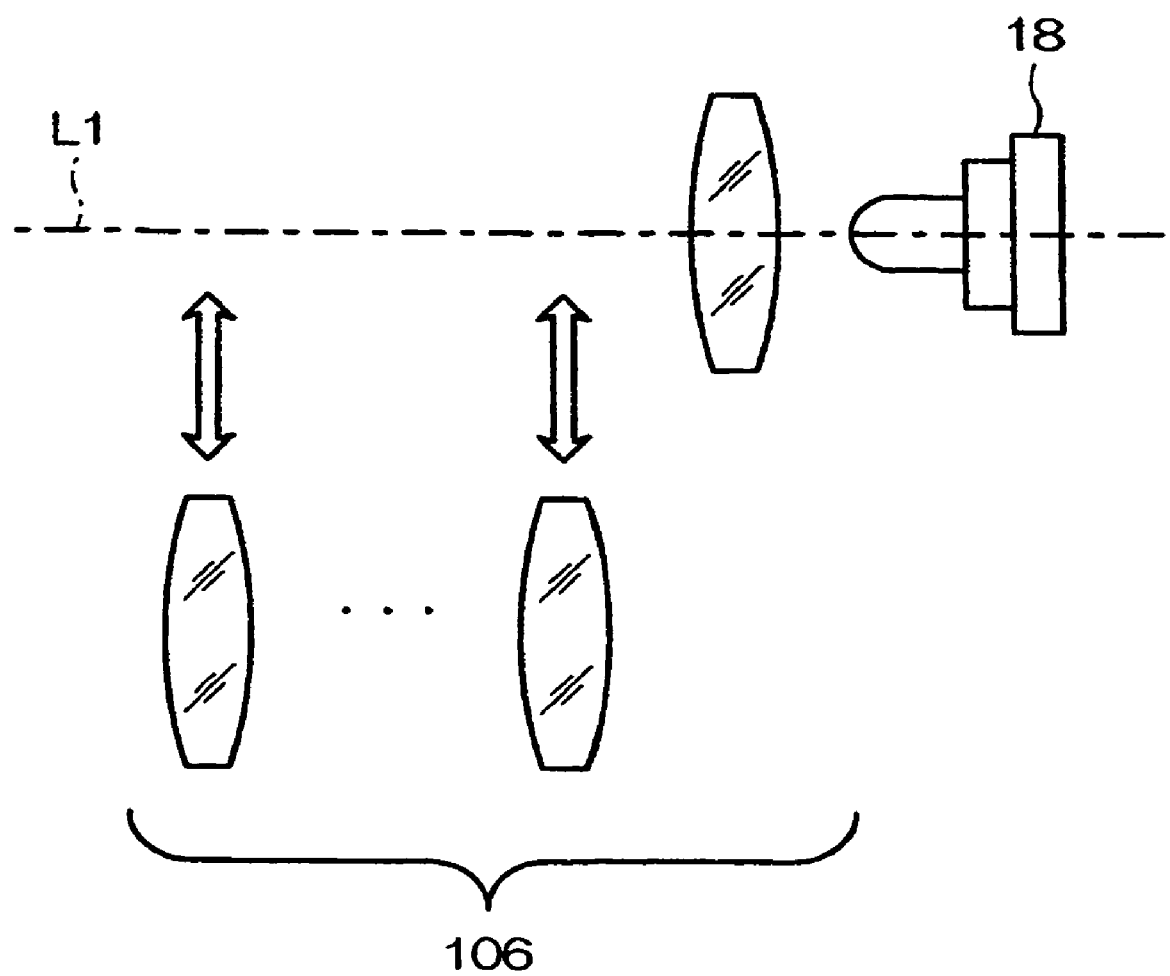
FIG. 5 is a figure schematically showing a method for controlling an irradiation range of AF auxiliary light.

Next, a method for controlling the irradiation range of the AF auxiliary light is described with reference to FIG. 4 and FIG. 5. FIG. 4 is a plan view showing the AF auxiliary light irradiation lens, and FIG. 5 is a figure schematically showing the method for controlling the irradiation range of the AF auxiliary light. As shown in FIG. 4, the AF auxiliary light irradiation lens 42 is constituted by fitting lenses 106 in a plate-like member 104. In making the AF auxiliary light emitted, the CPU 30 controls the AF auxiliary light irradiation lens control circuit 44 in accordance with a zoom position. Then, as shown in FIG. 5, the lenses 106 on the optical axis L1 of the AF auxiliary light lamp 18 is exchanged or added. Thereby, the irradiation range of the AF auxiliary light lamp 18 is controlled.

Figure 6:
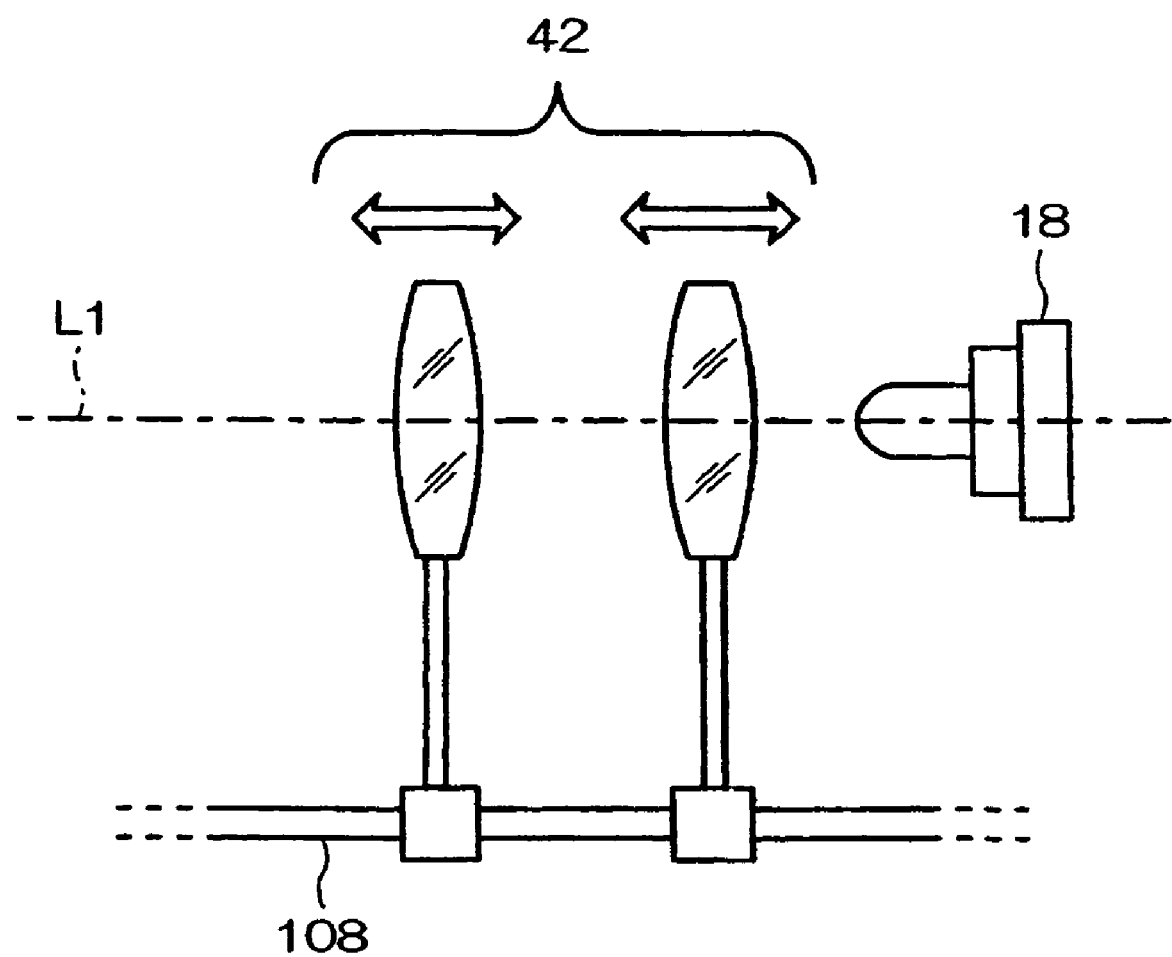
FIG. 6 is a figure schematically showing another example of the method for controlling the irradiation range of AF auxiliary light.

Noted that as shown in FIG. 6, the irradiation range of the AF auxiliary light lamp 18 may be arranged to be controlled by providing a guide 108 for moving the AF auxiliary light irradiation lens 42 in parallel with the optical axis L1 of the AF auxiliary light lamp 18 so as to move the AF auxiliary light irradiation lens 42 in the optical axis L1 direction.

Figure 7:
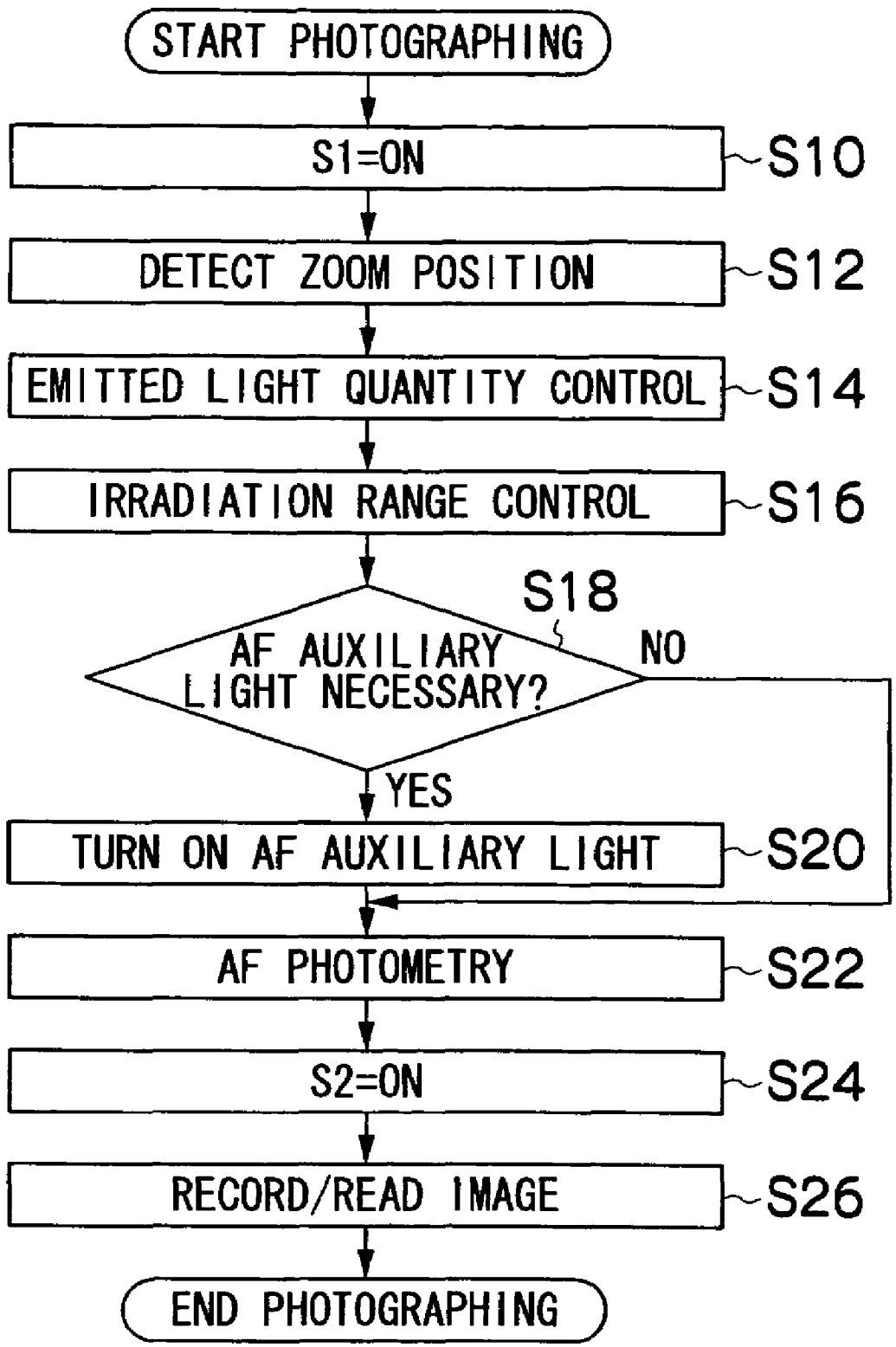
FIG. 7 is a flow chart showing a process flow of AF auxiliary light control at the time of photographing.

FIG. 7 is a flow chart showing a process flow of AF auxiliary light control at the time of photographing. First, when the release switch 20 is half depressed (S1=ON) (step S10), a zoom position is detected by the CPU 30 (step S12), and emitted light quantity (step S14) and an irradiation range (step S16) of the AF auxiliary light are controlled.

Figure 8:
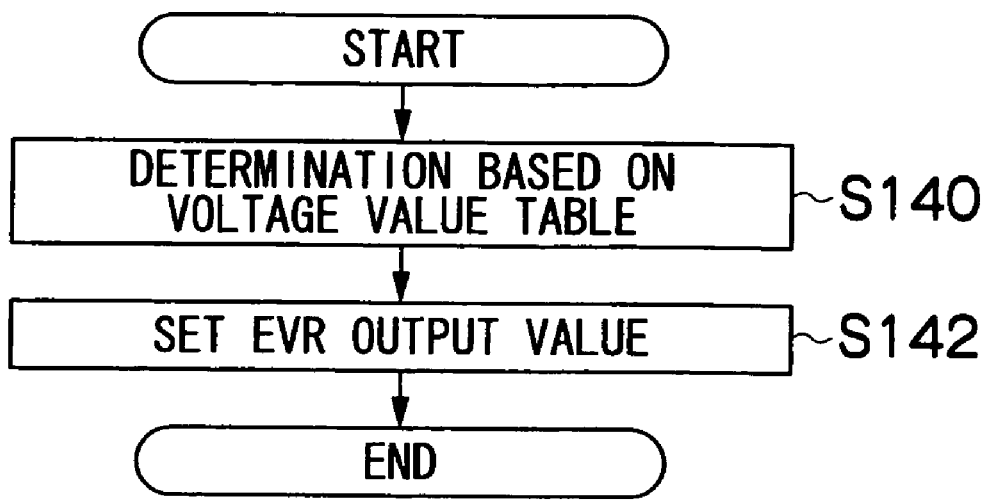
FIG. 8 is a flow chart showing a method for controlling emitted light quantity of AF auxiliary light.

Here, a method for controlling the emitted light quantity of the AF auxiliary light in step S14 is described. FIG. 8 is a flow chart showing the method for controlling the emitted light quantity of the AF auxiliary light. First, on the basis of the zoom position detected in step S12 described above, the voltage value-emitted light quantity table stored in the EEPROM 36 is referred to (step S140). Then, the electronic volume (EVR) of the voltage regulation circuit 100 is controlled (step S142), so that the emitted light quantity of the AF auxiliary light is controlled.

Figure 9:
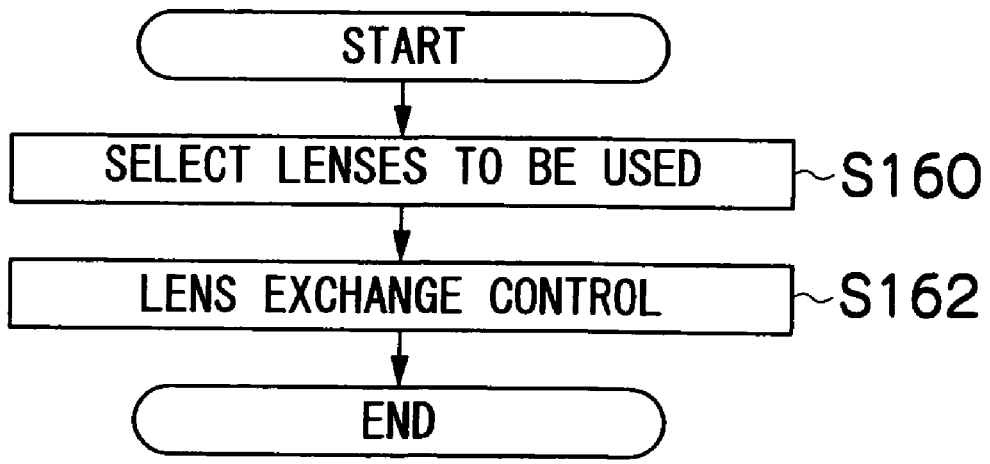
FIG. 9 is a flow chart showing a method for controlling the irradiation range of AF auxiliary light.

Subsequently, a method for controlling the irradiation range of the AF auxiliary light in step S16 is described. FIG. 9 is a flow chart showing the method for controlling the irradiation range of the AF auxiliary light. First, on the basis of the zoom position detected in step S12 described above, a combination of the lenses 106 used for irradiating the AF auxiliary light is determined (step S160). Then, the AF auxiliary light irradiation lens control circuit 44 is controlled by the CPU 30, so that the lenses 106 on the optical axis L1 of the AF auxiliary light lamp 18 is exchanged or added (step S162).

Reverting to the flow chart in FIG. 7, the process continues to step S18, and whether the AF auxiliary light is necessary or not at the time of AF is judged on the basis of the luminance of a screen display and the like. When the AF auxiliary light is judged to be necessary in step S18, the AF auxiliary light lamp 18 is turned on (step S20), and AF photometry is performed (step S22). On the other hand, when the AF auxiliary light is judged to be unnecessary in step S18, AF photometry is performed without making the AF auxiliary light lamp 18 turned on (step S22).

Next, when the release switch 20 is fully depressed (S2=ON) (step S24), photographing is performed, and an image is recorded in the recording medium 88. Further, the image is read out from the recording medium 88 and displayed in the monitor 78 (step S26).

According to the present embodiment, the emitted light quantity and the irradiation range of the AF auxiliary light are controlled in accordance with the zoom position of the taking lens 12, so that the precision of AF can be improved.

Figure 10:
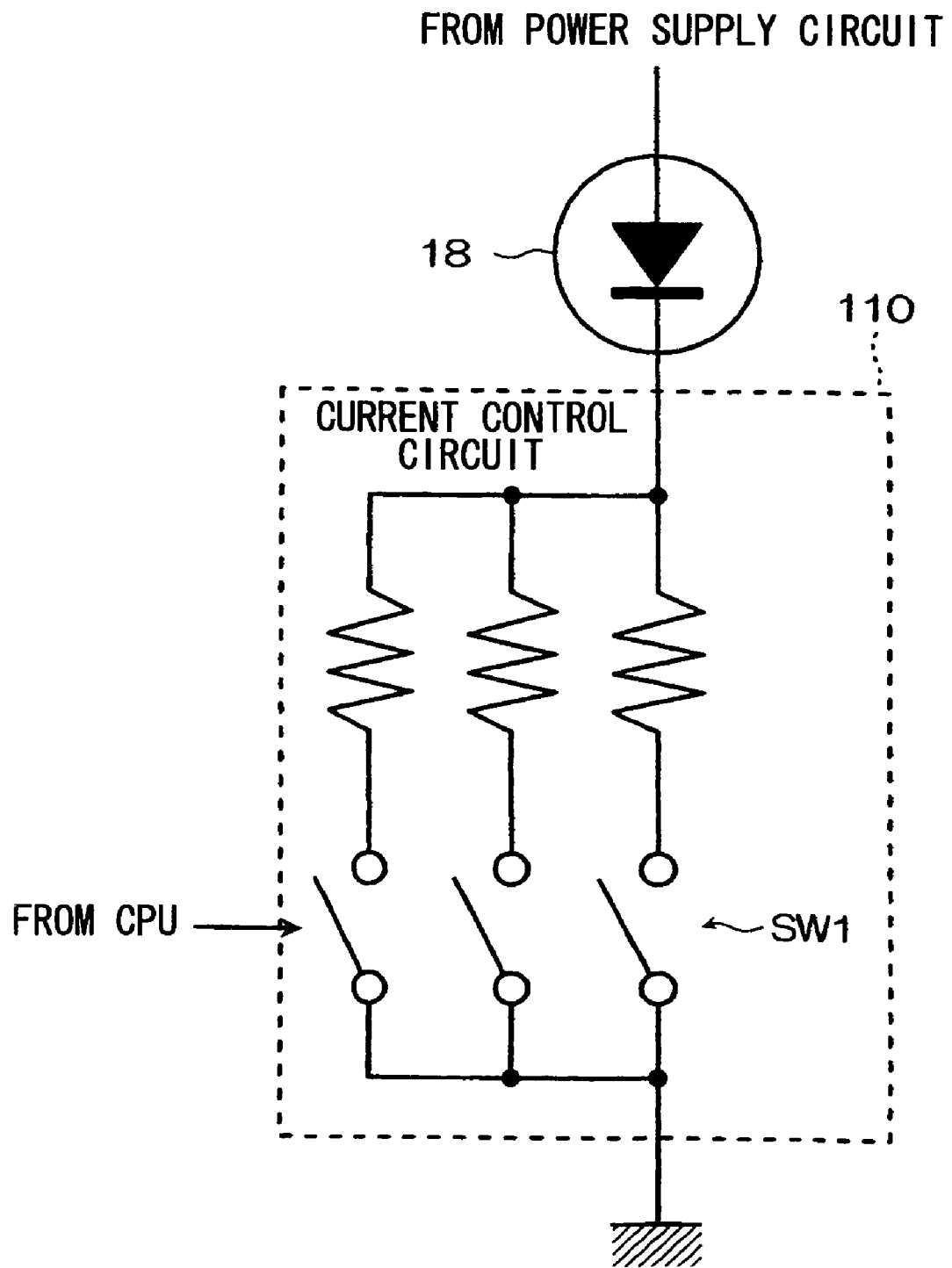
FIG. 10 is a circuit diagram showing a second exemplary configuration of the AF auxiliary light emission circuit.

Next, another exemplary configuration of the AF auxiliary light emission circuit is described. FIG. 10 is a circuit diagram showing a second exemplary configuration of the AF auxiliary light emission circuit. The AF auxiliary light emission circuit 40 shown in FIG. 10 comprises a current control circuit 110 for controlling current flowing through the AF auxiliary light lamp 18. The current control circuit 110 controls the resistance value by controlling resistance changeover switches SW1. Noted that in FIG. 10, three sets of a resistance and a resistance changeover switches SW1 are connected in parallel, but the number of resistors and the circuit configuration is not limited to this configuration. For example, a variable resistance may be used.

Figure 11:
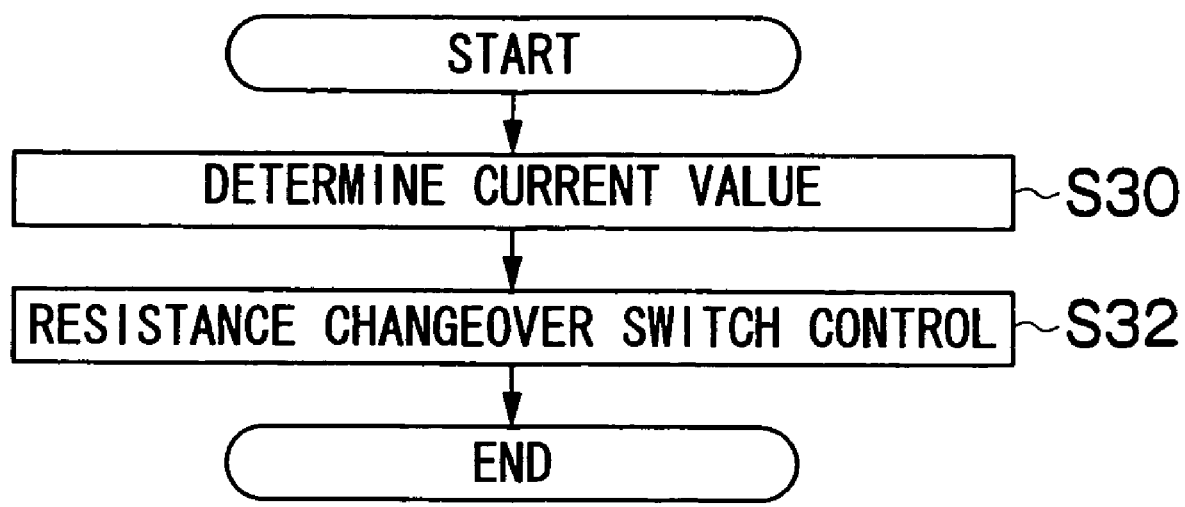
FIG. 11 is a flow chart showing a method for controlling emitted light quantity of AF auxiliary light, in which method the AF auxiliary light emission circuit according to the second exemplary configuration is used.

FIG. 11 is a flow chart showing a method for controlling the emitted light quantity of the AF auxiliary light in which the AF auxiliary light emission circuit according to the second exemplary configuration is used. First, on the basis of the zoom position detected in step S12 described above, the emitted light quantity of the AF auxiliary light for performing AF is calculated, and a current value necessary for emitting the AF auxiliary light is judged (step S30). Then, the resistance changeover switches SW1 of the current control circuit 110 is controlled (step S32), so that the emitted light quantity of the AF auxiliary light is controlled.

Figure 12:
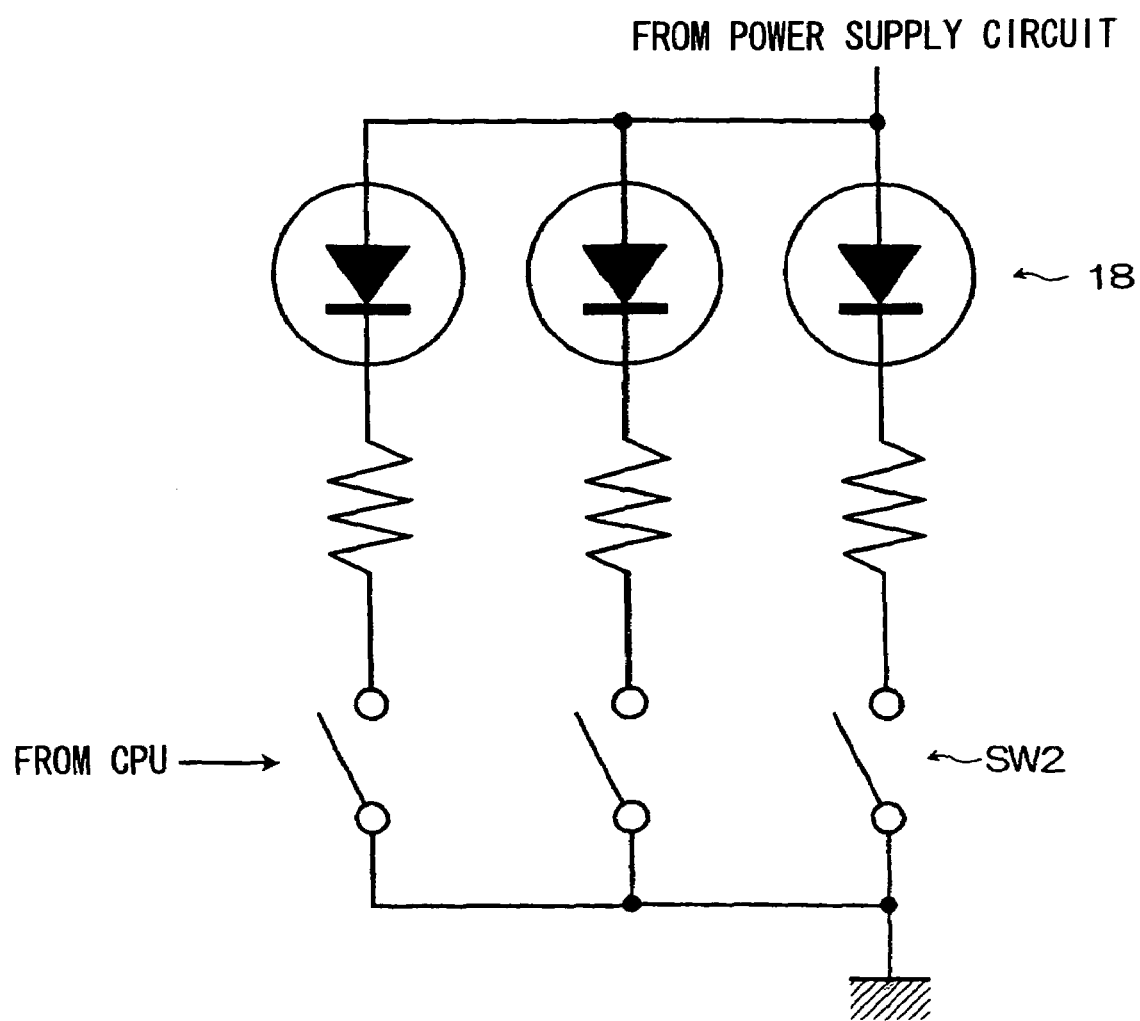
FIG. 12 is a circuit diagram showing a third exemplary configuration of the AF auxiliary light emission circuit.

FIG. 12 is a circuit diagram showing a third exemplary configuration of the AF auxiliary light emission circuit. In the example shown in FIG. 12, a plurality of (three in the example in FIG. 12) AF auxiliary light lamps 18 are provided, and the AF auxiliary light emission circuit 40 comprises lighting number changeover switches SW2 for controlling the number of the AF auxiliary light lamps 18 which are made to turn on. Noted that in FIG. 12, three sets of a resistance and an AF auxiliary light lamp 18 are connected in parallel, but the number of the auxiliary light lamp 18 is not limited to this configuration.

Figure 13:
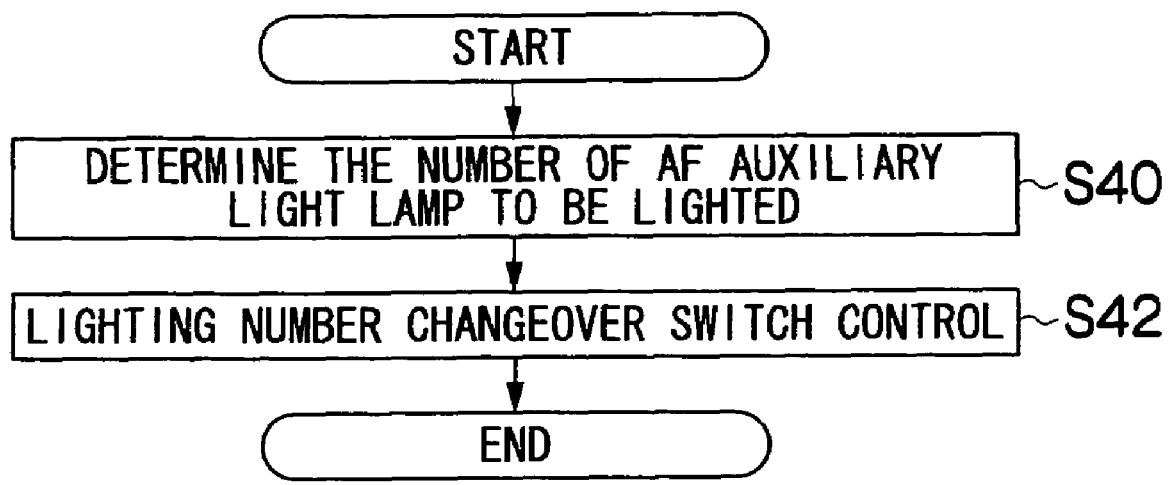
FIG. 13 is a flow chart showing a method for controlling emitted light quantity of AF auxiliary light, in which method the AF auxiliary light emission circuit according to the third exemplary configuration is used.

FIG. 13 is a flow chart showing a method for controlling the emitted light quantity of the AF auxiliary light in which the AF auxiliary light emission circuit according to the third exemplary configuration is used. First, on the basis of the zoom position detected in step S12 described above, the emitted light quantity of the AF auxiliary light for performing AF is calculated, and the lighting number of the AF auxiliary light lamp 18 necessary for emitting the AF auxiliary light is determined (step S40). Then, the lighting number changeover switches SW2 is controlled (step S42), so that the emitted light quantity of the AF auxiliary light is controlled.

What is claimed is:

1. An imaging device comprising:
an image sensor which has a light receiving surface:
a photographic optical system which forms an image of a photographic subject on the light receiving surface of the image sensor, the photographic optical system includes a zoom lens to perform zoom operation of the image of the subject;
an auxiliary light irradiation device which includes an auxiliary light source emitting an auxiliary light and which irradiates the auxiliary light towards the subject;
a range finding device which makes said auxiliary light reflected by said subject incident on said photographic optical system to perform a focusing operation; and
an auxiliary light control device which controls at least one of emitted light quantity of said auxiliary light and irradiation range of said auxiliary light in accordance with a zoom position of said zoom lens.

2. The imaging device according to claim 1, wherein said auxiliary light control device comprises an applied voltage change device which changes a power supply voltage applied to said auxiliary light source in accordance with the zoom position of said photographic optical system.

3. The imaging device according to claim 1, wherein said auxiliary light control device comprises a current quantity control device which controls the quantity of current flowing through said auxiliary light irradiation device in accordance with the zoom position of said photographic optical system.

4. The imaging device according to claim 2, wherein said auxiliary light control device comprises a current quantity control device which controls the quantity of current flowing through said auxiliary light irradiation device in accordance with the zoom position of said photographic optical system.

5. The imaging device according to claim 1, wherein said auxiliary light irradiation device comprises a plurality of auxiliary sources, and
wherein said auxiliary light control device comprises a lighting light source number change device which changes the number of said auxiliary light sources that are turned on in accordance with the zoom position of said photographic optical system.

6. The imaging device according to claim 2, wherein said auxiliary light irradiation device comprises a plurality of auxiliary light sources, and
wherein said auxiliary light control device comprises a lighting light source number change device which changes the number of said auxiliary sources that are turned on in accordance with the zoom position of said photographic optical system.

7. The imaging device according to claim 3, wherein said auxiliary light irradiation device comprises a plurality of auxiliary light sources, and
wherein said auxiliary light control device comprises a lighting light source number change device which changes the number of said auxiliary light sources that are turned on in accordance with the zoom position of said photographic optical system.

8. The imaging device according to claim 4, wherein said auxiliary light irradiation device comprises a plurality of auxiliary light sources, and
wherein said auxiliary light control device comprises a lighting light source number change device which changes the number of said auxiliary light sources that are turned on in accordance with the zoom position of said photographic optical system.

9. The imaging device according to claim 1, wherein said auxiliary light irradiation device comprises a plurality of irradiation lenses irradiating said auxiliary light irradiated from said auxiliary light source to said subject, and
wherein said auxiliary light control device controls the irradiation range of said auxiliary light by exchanging or combining said plurality of irradiation lenses.

10. The imaging device according to claim 2, wherein said auxiliary light irradiation device comprises a plurality of irradiation lenses irradiating said auxiliary light irradiated from said auxiliary light source to said subject, and
wherein said auxiliary light control device controls the irradiation range of said auxiliary light by exchanging or combining said plurality of irradiation lenses.

11. The imaging device according to claim 3, wherein said auxiliary light irradiation device comprises a plurality of irradiation lenses irradiating said auxiliary light irradiated from said auxiliary light source to said subject, and
wherein said auxiliary light control device controls the irradiation range of said auxiliary light by exchanging or combining said plurality of irradiation lenses.

12. The imaging device according to claims 4, wherein said auxiliary light irradiation device comprises a plurality of irradiation lenses irradiating said auxiliary light irradiated from said auxiliary light source to said subject, and
wherein said auxiliary light control device controls the irradiation range of said auxiliary light by exchanging or combining said plurality of irradiation lenses.

13. The imaging device according to claim 5, wherein said auxiliary light irradiation device comprises a plurality of irradiation lenses irradiating said auxiliary light irradiated from said auxiliary light source to said subject, and wherein said auxiliary light control device controls the irradiation range of said auxiliary light by exchanging or combining said plurality of irradiation lenses.

14. The imaging device according to claim 6, wherein said auxiliary light irradiation device comprises a plurality of irradiation lenses irradiating said auxiliary light irradiated from said auxiliary light source to said subject, and wherein said auxiliary light control device controls the irradiation range of said auxiliary light by exchanging or combining said plurality of irradiation lenses.

15. The imaging device according to claim 7, wherein said auxiliary light irradiation device comprises a plurality of irradiation lenses irradiating said auxiliary light irradiated from said auxiliary light source to said subject, and wherein said auxiliary light control device controls the irradiation range of said auxiliary light by exchanging or combining said plurality of irradiation lenses.

16. The imaging device according to claim 8, wherein said auxiliary light irradiation device comprises a plurality of irradiation lenses irradiating said auxiliary light irradiated from said auxiliary light source to said subject, and wherein said auxiliary light control device controls the irradiation range of said auxiliary light by exchanging or combining said plurality of irradiation lenses.

17. The imaging device according to claim 1, further comprising:

an electronic flash light source, an electronic flash light control device which controls the light emitted by said electronic flash light source, wherein said electronic flash light control device controls said electronic flash light source to emit light incident to said photographic optical system to perform an image capture operation.

18. The imaging device according to claim 9, wherein said zoom lens is a lens separate from said plurality of irradiation lenses.

* * * * *